(12) United States Patent
Yamada et al.

(10) Patent No.: US 11,448,204 B2
(45) Date of Patent: Sep. 20, 2022

(54) DIAPHRAGM PUMP WITH VALVE SWITCHING DEVICE

(71) Applicant: YAMADA CORPORATION, Tokyo (JP)

(72) Inventors: Kotaro Yamada, Sagamihara (JP); Satoru Suwabe, Sagamihara (JP)

(73) Assignee: YAMADA CORPORATION, Tokyo (JP)

( * ) Notice: Subject to any disclaimer, the term of this patent is extended or adjusted under 35 U.S.C. 154(b) by 0 days.

(21) Appl. No.: 17/056,677

(22) PCT Filed: May 23, 2019

(86) PCT No.: PCT/JP2019/020486
§ 371 (c)(1),
(2) Date: Nov. 18, 2020

(87) PCT Pub. No.: WO2019/225704
PCT Pub. Date: Nov. 28, 2019

(65) Prior Publication Data
US 2021/0207593 A1 Jul. 8, 2021

(30) Foreign Application Priority Data
May 24, 2018 (JP) .............................. JP2018-099959

(51) Int. Cl.
*F04B 43/06* (2006.01)
*F04B 45/053* (2006.01)

(52) U.S. Cl.
CPC ............ *F04B 43/06* (2013.01); *F04B 45/053* (2013.01)

(58) Field of Classification Search
CPC ...... F04B 43/02; F04B 43/025; F04B 43/026; F04B 43/06; F04B 45/033; F04B 45/0336; F04B 43/073
(Continued)

(56) References Cited

U.S. PATENT DOCUMENTS

| 3,791,768 A | 2/1974 | Wanner |
| 4,019,838 A * | 4/1977 | Fluck ..................... F01L 25/066 |
| | | 417/393 |

(Continued)

FOREIGN PATENT DOCUMENTS

| CA | 2 439 662 A1 | 3/2004 |
| EP | 1 396 638 A2 | 3/2004 |

(Continued)

OTHER PUBLICATIONS

Japanese Decision to Grant a Patent for Japanese Patent Application No. 2018-099959, dated Jan. 26, 2021, with Machine translation.

(Continued)

*Primary Examiner* — Essama Omgba
*Assistant Examiner* — Dnyanesh G Kasture
(74) *Attorney, Agent, or Firm* — Birch Stewart Kolasch & Birch, LLP

(57) ABSTRACT

To manufacture a diaphragm pump with higher reliability in which the mechanism of a main valve is simplified without a pilot chamber. A diaphragm pump 10 includes paired diaphragms 34 and 44 that define pump chambers 36, 46 and air chambers 32, 42, a main body unit 20 that slidably supports a center rod 120 at a central portion of each diaphragm 34, 44 so as to be capable of reciprocating the center rod 120, and a valve body 80 that houses a spool 100 that switches supply of a fluid to the air chambers 32 and 42 so as to reciprocate the center rod 120, the valve body 80 including a sleeve 84, and the spool 100 that is disposed inside the sleeve 84 to be reciprocated in an axial direction, wherein the spool 100 is composed of a disc-shaped portion S3, a disc-shaped portion S2, and a disc-shaped portion S1, and a surface area of each disc-shaped portion that receives a compressed air pressure has a relationship that an upper side of the disc-shaped portion S3>a lower side of the (Continued)

disc-shaped portion S2>an upper side of the disc-shaped portion S1.

5 Claims, 14 Drawing Sheets

(58) Field of Classification Search
USPC .................................................. 137/625.69
See application file for complete search history.

(56) References Cited

U.S. PATENT DOCUMENTS

| | | | | |
|---|---|---|---|---|
| 5,232,352 | A | * | 8/1993 | Robinson ............ F04B 43/0736 |
| | | | | 417/393 |
| 5,277,555 | A | | 1/1994 | Robinson |
| 5,326,234 | A | | 7/1994 | Versaw et al. |
| 5,391,060 | A | * | 2/1995 | Kozumplik, Jr. ... F04B 43/0736 |
| | | | | 417/393 |
| 5,421,367 | A | * | 6/1995 | Murata ............... F16K 11/0712 |
| | | | | 137/625.69 |
| 6,076,552 | A | * | 6/2000 | Takahashi .......... F15B 13/0402 |
| | | | | 137/625.3 |
| 2004/0047749 | A1 | * | 3/2004 | Roberts ............... F04B 43/0736 |
| | | | | 417/395 |
| 2004/0050242 | A1 | * | 3/2004 | Roberts ................... F04B 53/08 |
| | | | | 91/218 |
| 2016/0047377 | A1 | | 2/2016 | Tommasini |

FOREIGN PATENT DOCUMENTS

| | | |
|---|---|---|
| JP | 7-43220 U | 8/1995 |
| JP | 2001-165053 A | 6/2001 |
| JP | 2003-201968 A | 7/2003 |
| JP | 2005-54739 A | 3/2005 |
| JP | 4301975 B2 | 7/2009 |
| JP | 2017-527744 A | 9/2017 |
| JP | 6832888 B2 | 2/2021 |
| WO | WO 2015/044131 A1 | 4/2015 |

OTHER PUBLICATIONS

International Search Report for PCT/JP2019/020486 dated Aug. 13, 2019.

* cited by examiner

DIAPHRAGM PUMP WITH VALVE SWITCHING DEVICE

TECHNICAL FIELD

The present invention relates to an improvement of a diaphragm pump apparatus that includes paired diaphragms that partition a liquid feeding chamber and an air chamber, a main body unit that supports a center rod having the diaphragms attached to both end parts thereof so as to be capable of reciprocating, and a valve switching device (spool) that switches the supply of air to air chambers so as to reciprocate the center rod.

BACKGROUND ART

There has been conventionally known a diaphragm pump apparatus that includes paired diaphragms that partition a pump chamber and an air chamber, a main body unit that supports a center rod having central portions of the diaphragms attached to both end parts thereof so as to be capable of reciprocating, and a switching valve device that switches the supply of operating air to air chambers so as to reciprocate the center rod (JP 2003-201968 A).

In JP 2003-201968 A, the valve switching device includes a sleeve, a spool that is disposed inside the sleeve to reciprocate in an axial direction, and a spring mechanism (detent mechanism) that is disposed at one axial end part of the spool to prevent the spool from stopping at an intermediate position. In this conventional diaphragm pump apparatus, operating air is alternately supplied to an air chamber on a side of one diaphragm and an air chamber on a side of another diaphragm, based on switching of the supply of operating air to the air chambers, the center rod reciprocates to alternately increase the volume of one operating air chamber and the volume of another operating air chamber in a repeated manner, and these repeated operations cause a fluid to be alternately sucked into pump chambers from a suction port and the fluid sucked into the respective pump chambers to be alternately discharged from both pump chambers, so that the fluid is continuously discharged from an outlet.

JP 4301975 B2 is an improvement of such a spring mechanism (detent mechanism), in which pilot chambers are provided, a first pilot chamber is connected to a first port, and thus a pilot air pressure is constantly supplied, whereas a second pilot chamber is connected to a pilot flow path that is switched by the movement of the spool, so that the pilot air pressure is alternately supplied and discharged based on the movement of the spool. Here, the spool is directly connected to a diaphragm pump DP and is different from a spool of the present invention, but corresponds to a center rod switching chamber of the present invention. The first pilot chamber and the second pilot chamber are disposed inside a main valve that is separate from the center rod, and correspond to a valve body of the present invention.

With such a configuration, the diaphragm pump of JP 4301975 B2 is a diaphragm pump that includes a first port for supplying compressed air, a second port for discharging the compressed air, two diaphragms arranged to face each other, a spool that connects the two diaphragms to each other, a pilot flow path that is switched by the movement of the spool, and a main valve that is switched by a pilot air pressure that is supplied from the first port through the pilot flow path to supply and discharge the compressed air to and from the two diaphragms alternately. The main valve includes a first pilot chamber and a second pilot chamber whose pressure receiving area is larger than that of the first pilot chamber, the first pilot chamber is connected to the first port, and thus the pilot air pressure is constantly supplied, whereas the second pilot chamber is connected to the pilot flow path that is switched by the movement of the spool, so that the pilot air pressure is alternately supplied and discharged based on the movement of the spool.

In this invention, when the diaphragm pump is used for oil recovery, air is also sucked when sucking a supernatant liquid floating on a liquid surface, and thus the load becomes too light and the number of operations of the diaphragm per hour may increase more than necessary. Further, the same situation may occur when a small amount of liquid is left and thus the liquid level is low. In such a situation, not only the air consumption increases and the efficiency significantly decreases, but also the life of the diaphragm shortens, and as a result, the life of the diaphragm pump shortens. However, since a malfunction may occur when the pressure of the compressed air to be supplied is reduced, a first throttle control valve for throttling the compressed air supplied from the first port with meter-in control, or a second throttle control valve for throttling the compressed air discharged from the discharge port of the main valve with meter-out control is provided. However, these throttle control valves are provided so as not to intervene in the pilot flow path of the main valve for the purpose of adjusting the operation of the diaphragm pump.

CITATION LIST

Patent Literature

Patent Literature 1: JP 2003-201968 A
Patent Literature 2: JP 4301975 B2

SUMMARY OF INVENTION

Technical Problem

In JP 4301975 B2, since the spring mechanism (detent mechanism) is omitted, a smooth operation is achieved. However, a first pilot chamber and a second pilot chamber are provided to alternately supply and discharge a pilot air pressure, and thus the mechanism is complicated and a main valve is large. An object of the present invention is to manufacture a diaphragm pump with higher reliability in which the mechanism of a first pilot chamber and a second pilot chamber is simplified, the mechanism of a main valve is also simplified, and the main valve (valve body in present invention) is removable so as to be easily subjected to maintenance.

Solution to Problem

According to an embodiment of the invention, a diaphragm pump includes paired diaphragms that define a pump chamber and an air chamber, a main body unit that slidably supports a center rod at a central portion of each diaphragm so as to be capable of reciprocating the center rod, and a valve body that houses a spool that switches supply of a fluid to the air chambers so as to reciprocate the center rod, the valve body including a sleeve, and the spool that is disposed inside the sleeve to be reciprocated in an axial direction, wherein the spool includes a disc-shaped portion S3, a disc-shaped portion S2, and a disc-shaped portion S1, a surface area of each disc-shaped portion that receives a compressed air pressure has a relationship that an upper side of the disc-shaped portion S3>a lower side of the disc-shaped portion S2>an upper side of the disc-shaped portion S1, each disc-shaped portion of the spool includes a sealing functioning as a packing that separates each port with the sleeve, the sleeve includes, for the diaphragms, two ports that can communicate with an air inlet, and while the spool moves from a top of the valve body toward a bottom of the valve body in the sleeve, the air inlet is always located between the disc-shaped portion S2 and the disc-shaped portion S1 and a port that can communicate with the air inlet is changed depending on a movement of the spool, so that supply of the compressed air supplied from the air inlet is switched from one air chamber to another air chamber.

According to an embodiment of the invention, the center rod includes, near a center of the center rod, a center rod air port, when the center rod slides to be moved to one side, the compressed air is capable of entering the center rod air port from a conduit to which the compressed air is constantly supplied from the air inlet, and the compressed air passes through the center rod air port of the center rod to be supplied to an upper part of the disc-shaped portion S3, so that the spool is lowered smoothly.

According to an embodiment of the invention, when the center rod slides to be moved to another side that is opposite to the one side, supply of the compressed air that is constantly supplied from the air inlet to the center rod air port stops, the compressed air is capable of flowing in a conduit that is constantly connected to a port on an upper side of the disc-shaped portion S3 and a conduit that communicates with an air outlet, and the center rod air port communicates with the conduit that is connected to the port on the upper side of the disc-shaped portion S3 even when the center rod slides to be moved to the one side or the another side.

According to an embodiment of the invention, a guide bush is fitted into an outer peripheral part of the center rod, a hole for allowing the compressed air to flow is formed in a body part of the guide bush, and as the center rod slides, the center rod air port that has slid is used to allow the compressed air to pass through the center rod air port and to be supplied to the upper part of the disc-shaped portion S3, so that the spool is lowered smoothly.

According to an embodiment of the invention, the valve body includes a plurality of ports at arbitrary positions, the main body unit and the valve body are separated, a gasket having a loop-shaped or rectangular outer periphery is disposed between the main body unit and the valve body, and a plurality of pipes that connect the ports and allow the compressed air to flow are disposed in the gasket along a surface where the main body unit contacts the valve body.

According to an embodiment of the invention, a diaphragm pump includes paired diaphragms that define a pump chamber and an air chamber, a main body unit that slidably supports a center rod at a central portion of each diaphragm so as to be capable of reciprocating the center rod, and a valve body that houses a spool that switches supply of a fluid to the air chambers so as to reciprocate the center rod, the valve body including a sleeve, and the spool that is disposed inside the sleeve to be reciprocated in an axial direction, wherein the spool includes a disc-shaped portion S3, a disc-shaped portion S2, and a disc-shaped portion S1, a surface area of each disc-shaped portion that receives a compressed air pressure has a relationship that an upper side of the disc-shaped portion S3>a lower side of the disc-shaped portion S2>an upper side of the disc-shaped portion S1, each disc-shaped portion of the spool includes a sealing functioning as a packing that separates each port with the sleeve, the sleeve includes, for the diaphragms, two ports that can communicate with an air inlet, and while the spool moves from a top of the valve body toward a bottom of the valve body in the sleeve, the air inlet is always located between the disc-shaped portion S2 and the disc-shaped portion S1 and a port that can communicate with the air inlet is changed depending on a movement of the spool, so that supply of the compressed air supplied from the air inlet is switched from one air chamber to another air chamber.

The diameter of the disc-shaped portion S3 is equal to the diameter of the disc-shaped portion S2, but the disc-shaped portion S2 has a shaft with the disc-shaped portion S1, and thus the surface area of the upper side of the disc-shaped portion S3 is larger by the cross-sectional area of the shaft.

According to an embodiment of the invention, the center rod includes, near a center of the center rod, a center rod air port, when the center rod slides to be moved to one side, the compressed air is capable of entering the center rod air port from a conduit to which the compressed air is constantly supplied from the air inlet, and the compressed air passes through the center rod air port of the center rod to be supplied to an upper part of the disc-shaped portion S3, so that the spool is lowered smoothly. Consequently, sliding of the center rod is connected to sliding of the spool, and thus smooth switching of the spool can be achieved without using a spring mechanism.

According to an embodiment of the invention, when the center rod slides to be moved to another side that is opposite to the one side, supply of the compressed air that is constantly supplied from the air inlet to the center rod air port stops, the compressed air is capable of flowing in a conduit that is constantly connected to a port on an upper side of the disc-shaped portion S3 and a conduit that communicates with an air outlet, and the center rod air port communicates with the conduit that is connected to the port on the upper side of the disc-shaped portion S3 even when the center rod slides to be moved to the one side or the another side. As the compressed air is supplied to a top of the disc-shaped portion S3, the spool is lowered smoothly and is also raised smoothly by discharging the compressed air.

According to an embodiment of the invention, a guide bush is fitted into an outer peripheral part of the center rod, a hole for allowing the compressed air to flow is formed in a body part of the guide bush, and as the center rod slides, the center rod air port that has slid is used to allow the compressed air to pass through the center rod air port and to be supplied to the upper part of the disc-shaped portion S3, so that the spool is lowered smoothly. As the hole for allowing the compressed air to flow is formed in the body part of the guide bush, compressed air sealing properties can be maintained, and the spool can be switched more reliably.

According to an embodiment of the invention, the valve body includes a plurality of ports at arbitrary positions, the main body unit and the valve body are separated, a gasket having a loop-shaped or rectangular outer periphery is disposed between the main body unit and the valve body, and a plurality of pipes that connect the ports and allow the compressed air to flow are disposed in the gasket along a surface where the main body unit contacts the valve body. Consequently, maintenance of the valve body can be performed, and the compressed air can be reliably delivered between the valve body and the main body by the gasket.

DESCRIPTION OF EMBODIMENTS

Figure 1:
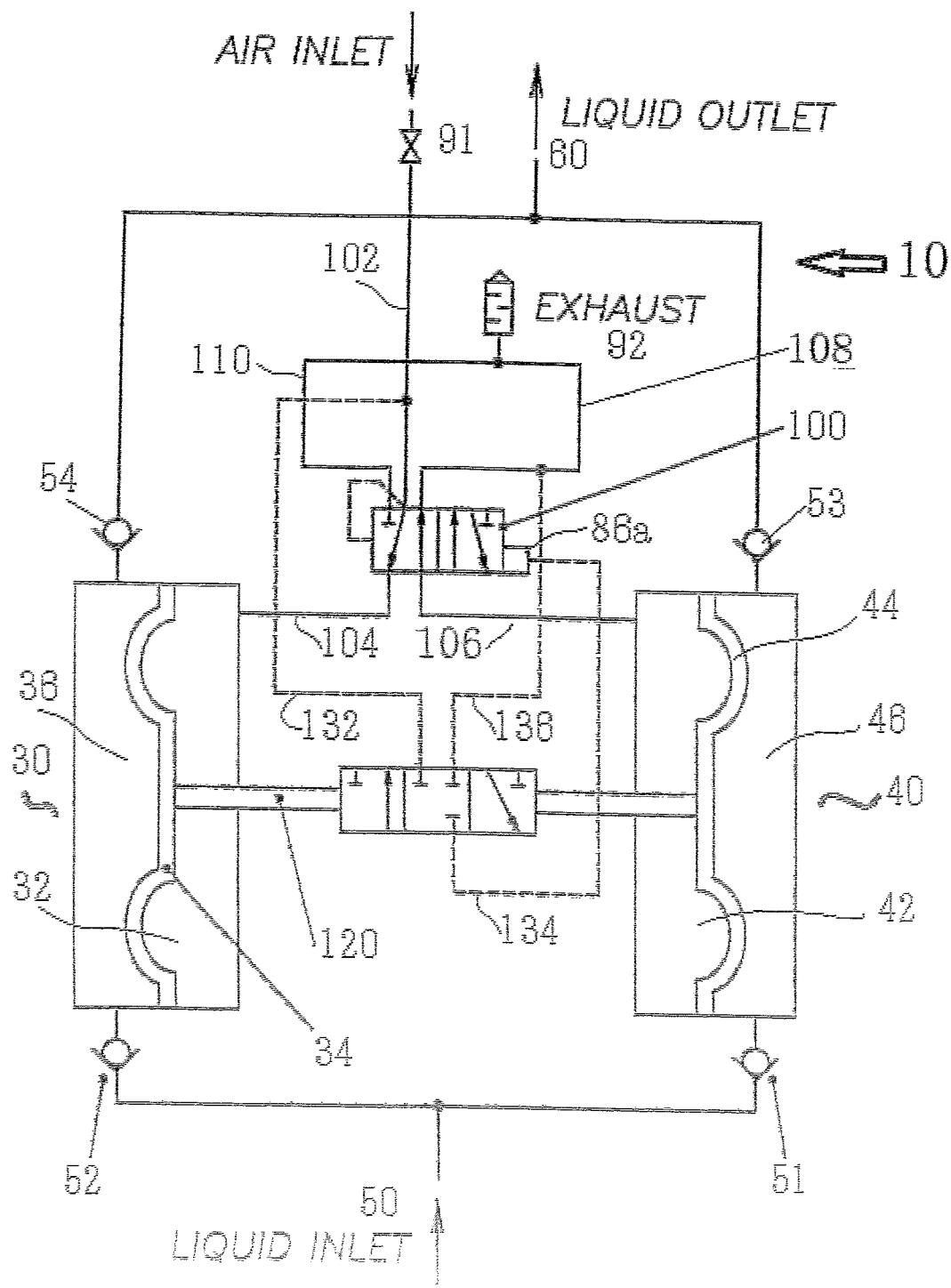
FIG. 1 is a circuit diagram of a diaphragm pump 10 according to the present invention.

FIG. 1 is a circuit diagram of a diaphragm pump 10 according to the present invention, in which compressed air is taken from an air inlet 91 through a conduit 102. The compressed air is then supplied to a spool 100 disposed inside the valve body 80. In FIG. 1, the compressed air is sent from the spool 100 to a left air chamber 32 through a conduit 104 (for example, when facing drawing, chamber on left side is referred to as "left air chamber", chamber on right side is "right air chamber", upper side is referred to as "upper direction", and lower side is referred to as "lower direction"). Consequently, a center rod 120 moves to the left on the drawing. Reference numeral 34 indicates a left diaphragm. On the other hand, a right air chamber 42 discharges the compressed air through a conduit 106. Reference numeral 44 indicates a right diaphragm. The compressed air in the right air chamber 42 is discharged from the conduit 106 to an air outlet 92 through the spool 100 and a conduit 108.

A fluid to be sent flows from an IN manifold 50 through a left pump chamber 36 and a right pump chamber 46, respectively, to be discharged from an OUT manifold 60 in a fixed amount.

The left diaphragm 34 and the right diaphragm 44 are coupled to the center rod 120. The center rod 120 has, near its center, a center rod air port 130 (not illustrated) having a smaller diameter than an end part of the center rod 120, and as the center rod 120 slides, a conduit 132 branched partway from the conduit 102 of the air inlet 91 is connected to the center rod air port 130. The center rod air port 130 is connected to a port 86a of the valve body 80 at the top of the spool 100 by a conduit 134, so that the compressed air can be supplied from the center rod air port 130 to the top of the spool 100. The spool thus moves from right to left on the drawing. A conduit 136 exhausts the compressed air to the top of the spool 100. The compressed air flows from the center rod air port 130 through the conduit 136 and the conduit 108 to be discharged to the air outlet 92. Reference numerals 51, 52, 53, and 54 are check valves, which are check valves for a conveying fluid.

Figure 2A:
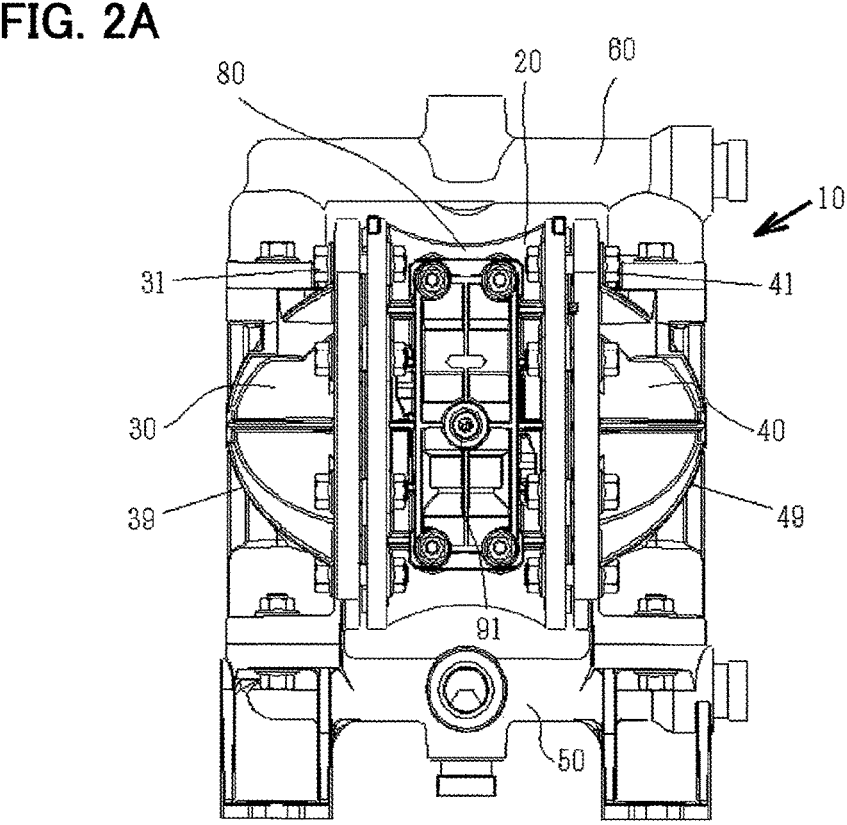
FIG. 2A is a front view of the diaphragm pump 10.
Figure 2B:
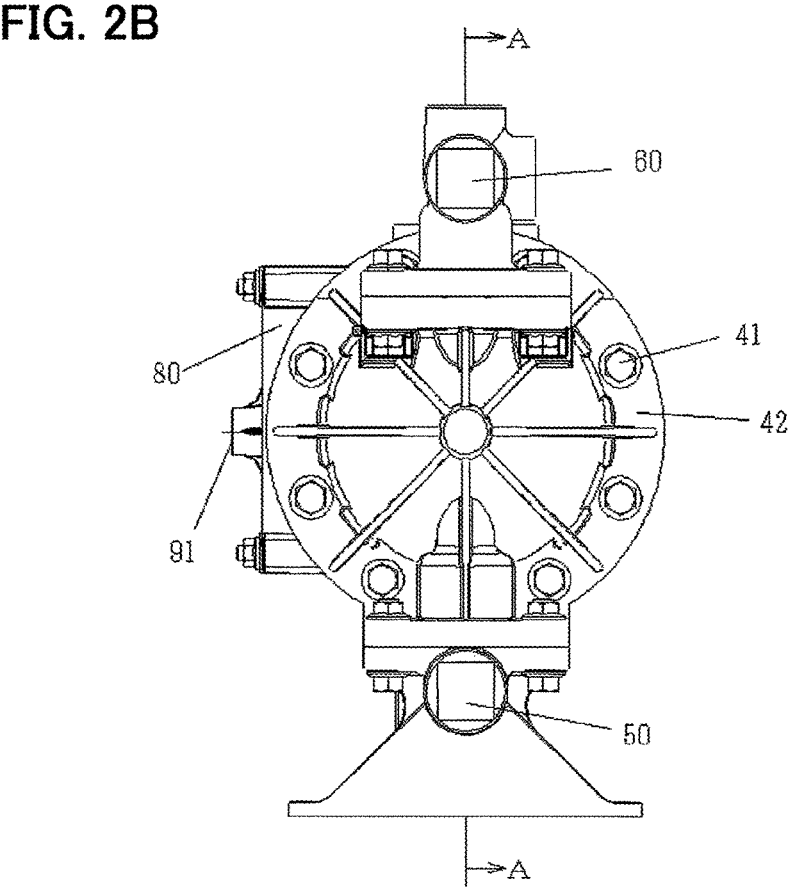
FIG. 2B is a right side view of the diaphragm pump 10.

FIG. 2A is a front view of the diaphragm pump 10 according to the present invention. Reference numeral 10 indicates a diaphragm pump, and the diaphragm pump 10 is composed of a main body unit 20, and a left diaphragm pump chamber 30 and a right diaphragm pump chamber 40 that are arranged on both sides of the main body unit 20. A left out chamber 39 and a right out chamber 49 are both fixed to the main body unit 20 by a plurality of bolts 31 and 41. Reference numeral 50 indicates an IN manifold, and reference numeral 60 indicates an OUT manifold. A fluid to be sent flows from the IN manifold 50 through the left pump chamber 36 or the right pump chamber 46 to be discharged from the OUT manifold 60 in a fixed amount. Reference numeral 80 indicates a valve body. As will be described later, the spool 100 is housed in the valve body 80. The air inlet 91 is a hole at the center of the valve body 80, and the air outlet 92 (not illustrated) is provided on a rear surface of the main body. The air inlet 91 sends the compressed air to the main body. FIG. 2B is a right side view of the diaphragm pump 10 according to the present invention.

Figure 3A:
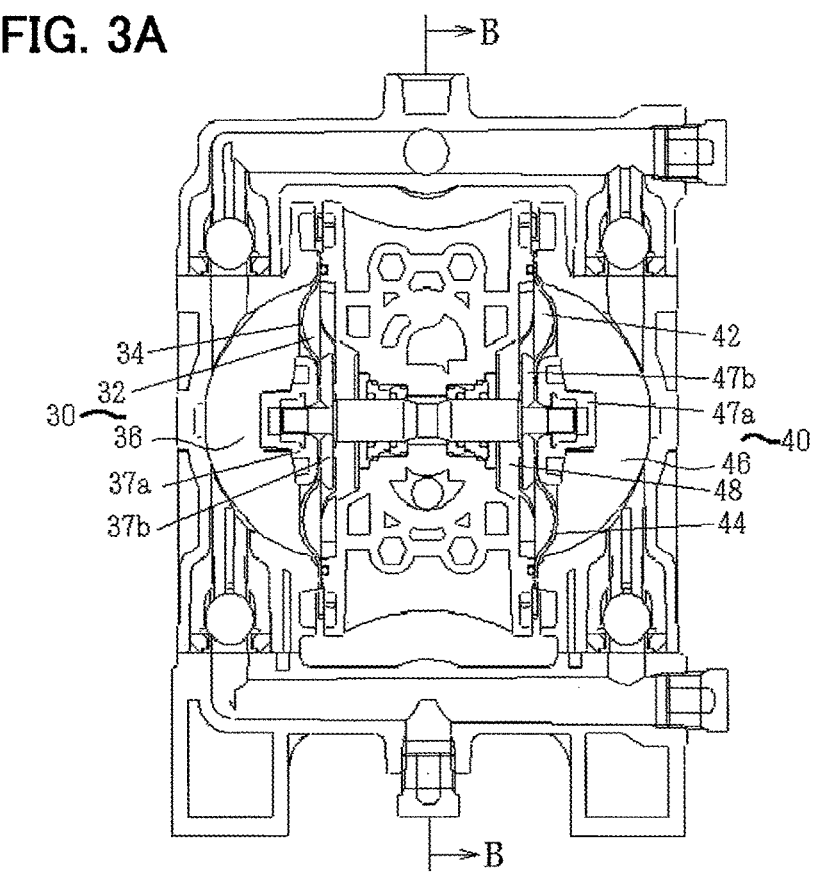
FIG. 3A is a cross-sectional view taken along a line A-A of FIG. 2B.
Figure 3B:
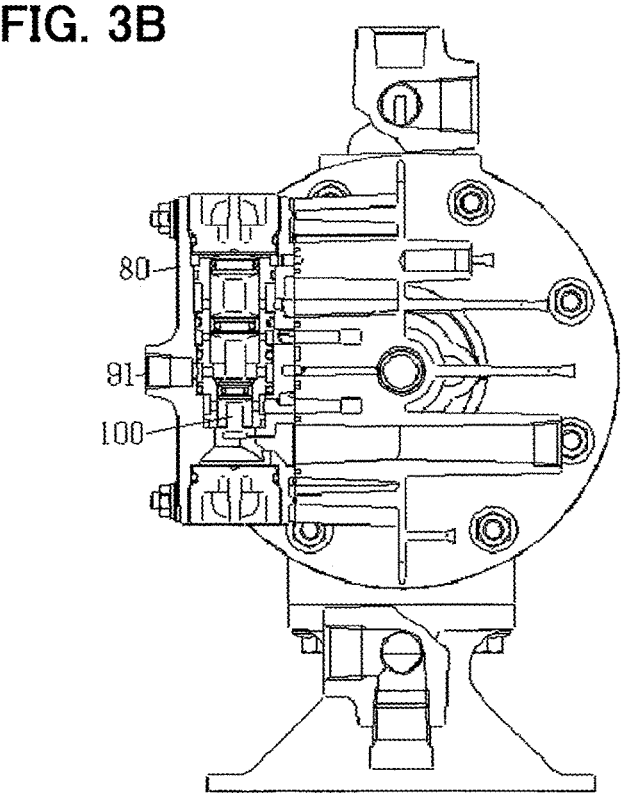
FIG. 3B is a right side explanatory view including a cross section taken along a line B-B of FIG. 3A.

FIG. 3A is a cross-sectional view taken along a line A-A of FIG. 2B. The center rod 120 is slidably supported at the center of the main body unit 20 so as to be capable of reciprocating. At the right end part of the center rod 120, disks 47a and 47b sandwich the disc-shaped right diaphragm 44, whereas at the left end part of the center rod 120, disks 37a and 37b sandwich the disc-shaped left diaphragm 34. Reference numerals 38 and 48 indicate cushions.

The paired diaphragms 34 and 44 have a curved diaphragm part. The left diaphragm 34 functions to define the left pump chamber 36 and the left air chamber 32, whereas the right diaphragm 44 functions to define the right pump chamber 46 and the right air chamber 42. The paired diaphragms 34 and 44 are sandwiched between the left diaphragm pump chamber 30 and the right diaphragm pump chamber 40, which are arranged on both sides of the main body unit 20, and the main body unit 20.

Figure 7:
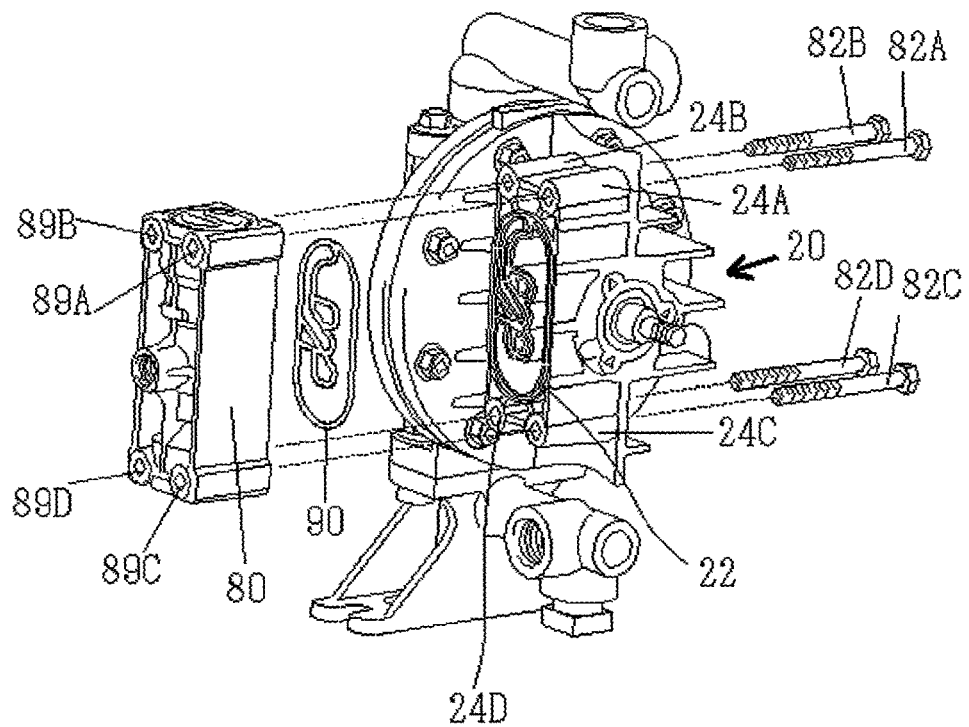
FIG. 7 is an explanatory view illustrating a state where bolts and nuts 82A, 82B, 82C, and 82D are inserted into the corresponding holes in the mounting relationship between the main body unit 20, the valve body 80, and the gasket 90.

As illustrated in FIG. 7, the valve body 80 is fixed to the front of the main body unit 20 using four fixing bolts and nuts 82A, 82B, 82C and 82D, and a gasket 90 made of rubber that can expand and contract is sandwiched between the valve body 80 and the main body unit 20. The gasket 90 will be described later.

The spool 100 is housed in the valve body 80. A sleeve 84 is disposed inside the valve body 80. The spool 100 is disposed inside the sleeve 84 so as to be capable of reciprocating in the axial direction (vertical direction).

Further, by releasing the four bolts and nuts 82A, 82B, 82C, 82D from the valve body 80, the valve body 80 can be removed from the main body unit 20 and the failure of the spool 100 can be handled quickly.

In addition, the sleeve is made of POM with excellent sliding characteristics. The respective ports in the valve body are separated by O-rings disposed in the respective portions.

Figure 4:
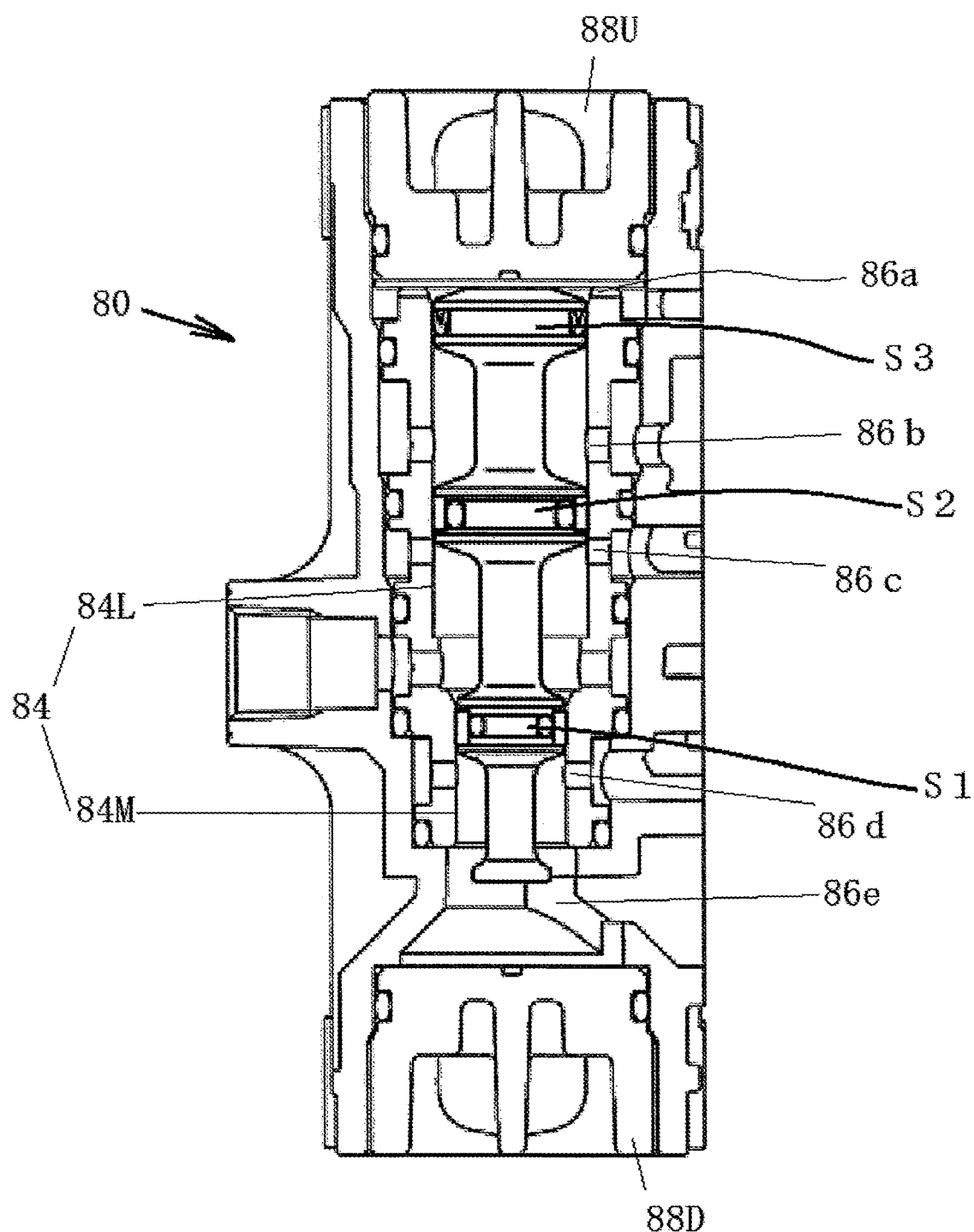
FIG. 4 is a right side cross-sectional view of a valve body 80.

As illustrated in FIG. 4, the valve body 80 is vertically divided into a reduced-diameter part 84M and an enlarged-diameter part 84L. The spool 100 is fitted so as to correspond to the sleeve 84 of the valve body 80. The spool 100 is composed of disc-shaped portions and rod portions joining the disc-shaped portions, and a disc-shaped portion S3 at an upper end among the disc-shaped portions moves in the enlarged-diameter part 84L. In principle, the disc-shaped portion S3, a disc-shaped portion S2, and a disc-shaped portion S1 have a structure in which an O-ring is attached to the inside of a seal ring. The seal ring is made of graphite-added PTFE, which has excellent sliding characteristics and does not easily wear the sleeve. The seal ring functions as a sliding part with the sleeve and a packing that separates each port, and the O-ring is provided on an inner diameter side of the seal ring.

The disc-shaped portion S2 is provided below the disc-shaped portion S3 with the rod part interposed therebetween. The disc-shaped portion S2 also moves in the enlarged-diameter part 84L, and the lower limit of the movement is the boundary of the enlarged-diameter part 84L and the reduced-diameter part 84M. The disc-shaped portion S1 is provided below the disc-shaped portion S2 with the rod part interposed therebetween, and the disc-shaped portion S1 moves only in the reduced-diameter part 84M. Here, comparing a diameter S3D of the disc-shaped portion S3, a diameter S2D of the disc-shaped portion S2, and a diameter S1D of the disc-shaped portion S1, S3D=S2D>S1D.

The surface area of each disc-shaped portion that receives a compressed air pressure is set such that an upper end side of the disc-shaped portion S3>a lower end side of disc-shaped portion S2>an upper end side of disc-shaped portion S1. The diameter of the disc-shaped portion S3 is equal to the diameter of the disc-shaped portion S2, but the disc-shaped portion S2 has a shaft with the disc-shaped portion S1, and thus the surface area of the upper side of the disc-shaped portion S3 is larger by the cross-sectional area of the shaft.

The sleeve 84 includes ports 86*a*, 86*b*, 86*c*, 86*d*, and 86*e* in this order from the top, and the port 86*a* introduces and discharges the compressed air to and from the center rod air port 130 through the conduit 134. In the case of introducing the compressed air, the disc-shaped portion S3 is pushed down. The port 86*b* is a port for discharging the compressed air in the left air chamber 32, and is connected to the conduit 110. The port 86*c* is a port for supplying and exhausting the compressed air in the left air chamber 32, and is connected to the conduit 104.

The port 86*d* is a port for supplying and exhausting the compressed air in the right air chamber 42, and is connected to the conduit 106. The port 86*e* is a port for discharging the compressed air in the right air chamber 42, and is connected to the conduit 108.

Figure 5A:
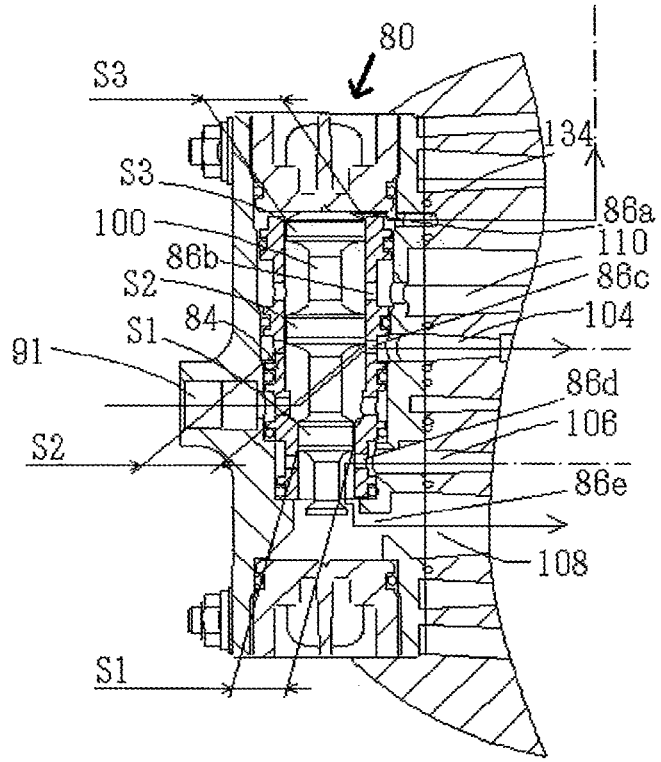
FIG. 5A is an explanatory view of a state where a spool 100 is moved to a top of the valve body 80.

The positions of the spool and the ports of the sleeve will be described with reference to FIGS. 5A and 5B. In FIG. 5A, the compressed air is supplied from the air inlet 91 to the left air chamber 32 through the port 86*c*. The left air chamber 32 is connected to the conduit 104. Here, the center rod 120 is placed at a position near the right air chamber 42. The compressed air is supplied to the left air chamber 32, and the right air chamber 42 exhausts air from the port 86*d* to the port 86*e*. As a result, the center rod moves from the right air chamber 42 toward the left air chamber 32. At this time, the compressed air is introduced from the air inlet 91 to the sleeve 84, and the surface area of receiving a compressed air pressure on the lower side of the disc-shaped portion S2 is larger than the surface area of receiving a compressed air pressure on the upper side of the disc-shaped portion S1.

To satisfy the relationship such as the disc-shaped portion S2>the disc-shaped portion S1, a force is applied to the spool 100 so as to move the spool 100 itself toward the disc-shaped portion S3.

Figure 5B:
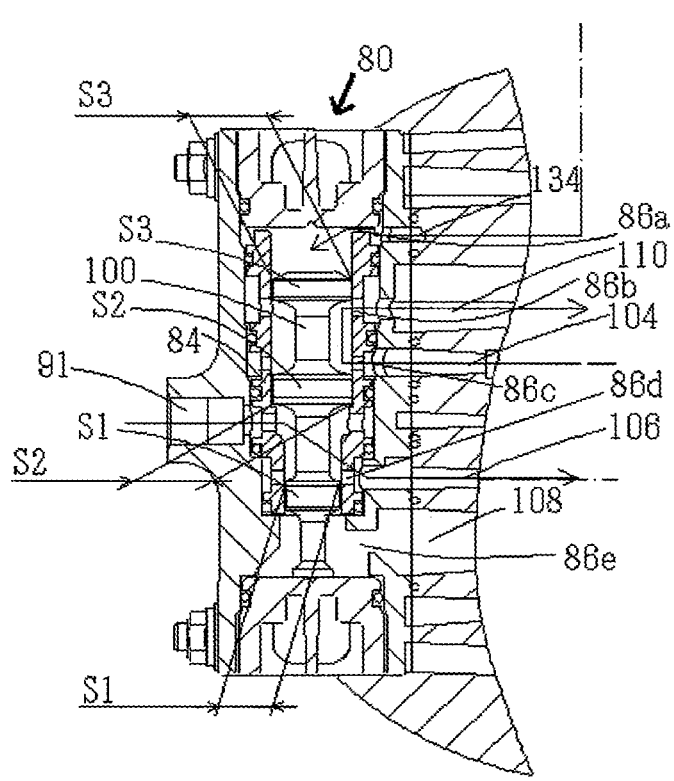
FIG. 5B is an explanatory view of a state where the spool 100 is moved to a bottom of the valve body 80.

FIG. 5B illustrates a state where the center rod air port 130 is connected to the port 86*a* of the sleeve 84 of the valve body 80 by the conduit 134, so that the compressed air is supplied from the center rod air port 130 to the top of the spool 100. At this time, the center rod 120 is moved to the left air chamber 32, and the compressed air is supplied to the center rod air port 130 from the conduit 132. This state will be described later. The compressed air is supplied from a guide bush of a narrow part at the central portion of the center rod 120, and the center rod air port 130 is connected to the port 86*a* of the sleeve 84 of the valve body 80 by the conduit 134, so that the compressed air is supplied to the top of the spool 100.

As a result, the disc-shaped portion S3 becomes the state of FIG. 5B from the state where the spool 100 contacts the top of the valve body 80 illustrated in FIG. 5A, so that the compressed air is supplied between the upper end part of the spool 100 and the disc-shaped portion S3. In this state, the compressed air from the air inlet 91 is supplied from the port 86*d* to the right air chamber 42 to push the disc-shaped portions S2 and S1. The entire spool 100 is pushed upward by the difference, which is calculated as the surface area of the disc-shaped portion S2 that receives a compressed air pressure—the surface area of the disc-shaped portion S1 that receives a compressed air pressure. However, since the compressed air is supplied to the port 86*a* of the sleeve 84 of the valve body 80 in the disc-shaped portion S3, the relationship that the surface area on the upper end side of the disc-shaped portion S3>the surface area on the lower end side of the disc-shaped portion S2—the surface area on the upper side of the disc-shaped portion S1 is established. The entire spool 100 is pushed down and moved downward to the lower limit.

At this time, the compressed air is supplied to the right air chamber 42, but the left air chamber 32 is in an exhaust state, the compressed air in the left air chamber 32 is exhausted from the port 86*c*, and the compressed air in the left air chamber 32 is discharged from the port 86*b*.

Figure 8:
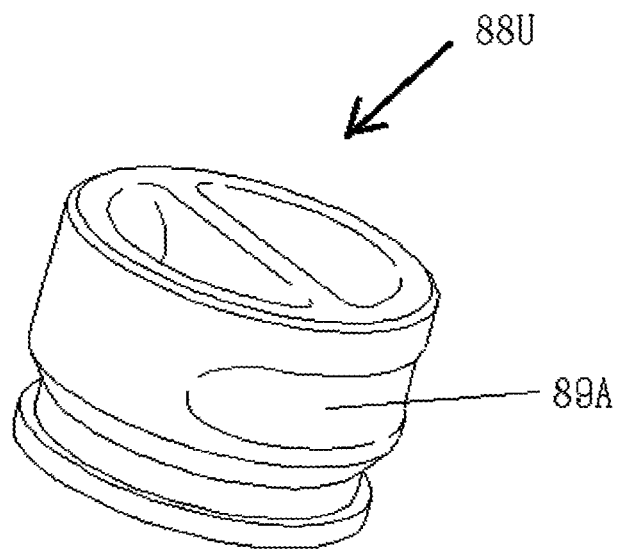
FIG. 8 is a perspective view of a cap 88U of the valve body 80.

In FIG. 4, reference numeral 88U indicates a circular cap at the top of the valve body 80 that can be opened and closed, and the spool 100 can be housed in the valve body 80. Reference numeral 88D indicates a circular cap at the bottom of the valve body 80. On the side of the cap 88U, lateral holes 89A and 89B are formed on the left and right sides at the top of the valve body 80 and lateral holes 89C and 89D are formed on the left and right sides at the bottom of the valve body 80 so that the valve body 80 can be fixed to the main body unit 20 with the four bolts and nuts 82A, 82B, 82C, and 82D. When the bolts and nuts 82A, 82B, 82C, and 82D are fitted into the lateral holes 89A, 89B, 89C, 89D for the purpose of fixing the valve body 80 to the main body unit 20, the bolt and nut penetrate the lateral hole 89A formed laterally on the circular side part of the cap 88U to be fixed (see FIG. 8). Although not illustrated, the bolts and nuts 82B, 82C, and 82D are also fitted into the lateral holes 89B, 89C, and 89D.

As illustrated in FIG. 7, the main body unit 20 includes the valve body receiving part 22 so as to correspond to the valve body 80, and main-body-part communicating lateral holes 24A, 24B, 24C, and 24D are formed so as to correspond to the lateral holes 89A, 89B, 89C, and 89D of the valve body 80.

Figure 6:
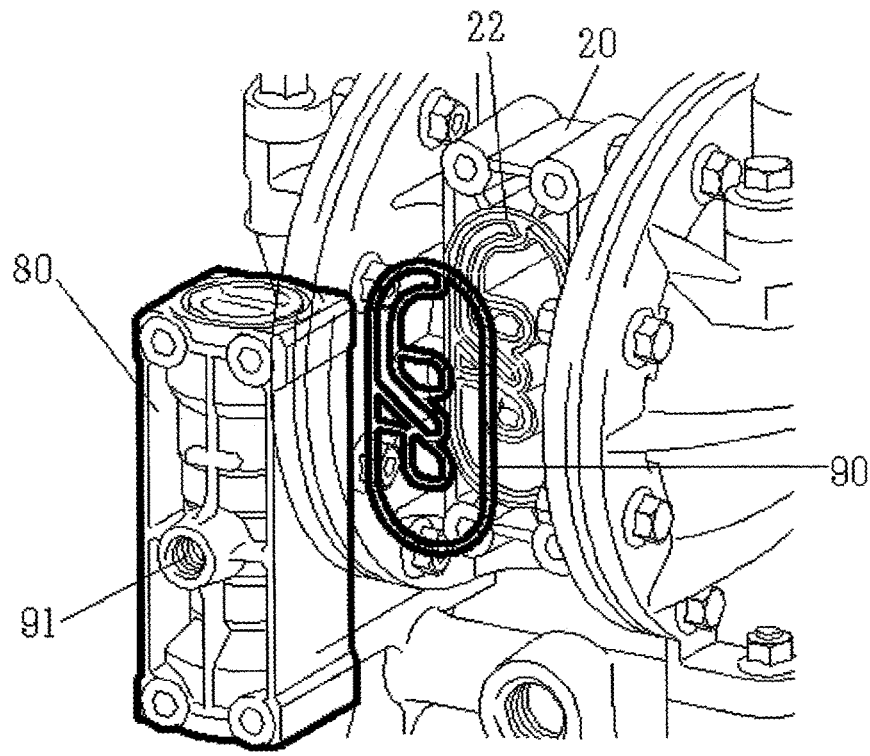
FIG. 6 is an explanatory view illustrating a mounting relationship between a main body unit 20, the valve body 80, and a gasket 90.
Figure 9:
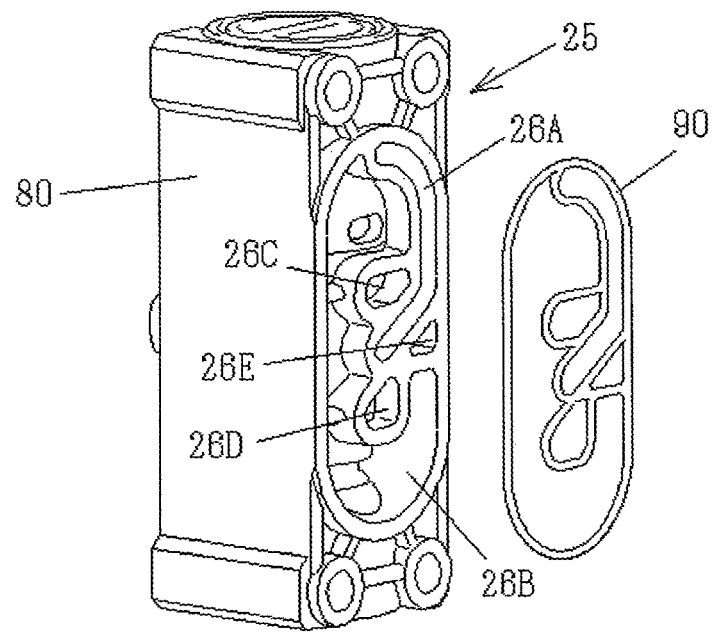
FIG. 9 is a perspective view illustrating a mounting relationship between the valve body 80 and the gasket 90.

As illustrated in FIGS. 6 and 9, the conduit of the valve body 80 is connected to the conduit of the main body unit 20. In a connection side surface 25 of the valve body 80 on a side of the main body unit, an upper part of the region 26A communicates with the port 86a of the sleeve 84, and a lower part thereof is connected to the center rod air port 130 by the conduit 134. In this region 26A, piping is vertically performed from the inlet/outlet of the port 86a to a central portion of the connection side surface 25 on the side of the valve body 80. The piping is then laterally performed from the central portion of the valve body 80 to the side of the main body unit to be connected to the center rod air port 130, so that the conduit 134 is formed as a whole.

An upper part of a region 26B of the connection side surface 25 of the valve body 80 on the side of the main body unit is connected to the port 86b provided below the port 86a of the valve body 80 in the region 26A. The port 86b is a port for discharging the compressed air in the left air chamber 32, and the upper part of the region 26B is a part of the conduit 110 and is finally connected to the air outlet 92.

Further, the lower part of the region 26B is connected to the port 86e, the port 86e is a port for discharging the compressed air in the right air chamber 42, and the region 26B is a part of the conduit 108, and is finally connected to the air outlet 92.

A region 26C of the connection side surface 25 of the valve body 80 on the side of the main body unit is connected to the port 86c of the sleeve 84, and the port 86c is a port for supplying and exhausting the compressed air in the left air chamber 32 and is connected to the conduit 104 through the region 26C.

A region 26D of the connection side surface 25 of the valve body 80 on the side of the main body unit is connected to the port 86d of the sleeve 84, and the port 86d is a port for supplying and exhausting the compressed air in the right air chamber 42 and is connected to the conduit 106 through the region 26D.

A region 26E of the connection side surface 25 of the valve body 80 on the side of the main body unit is a conduit through which the compressed air constantly supplied from the air inlet 91 passes and is also a part of the conduit 132, and the compressed air is sent to the center rod air port 130.

Figure 10:
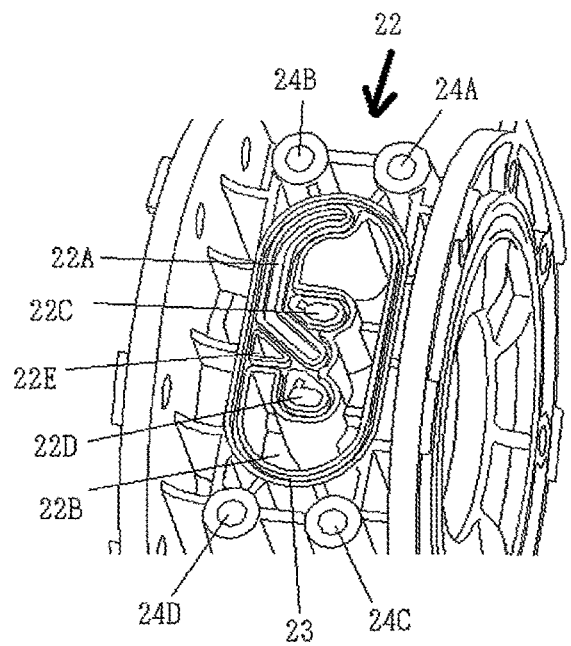
FIG. 10 is a perspective view of a valve body receiving part 22 of the main body unit 11211 20.

Similarly, regions 22A, 22B, 22C, 22D and 22E are formed in the valve body receiving part 22 of the main body unit 20 so as to correspond to the regions 26A, 26B, 26C, 26D and 26E of the connection side surface 25 of the valve body 80 on the side of the main body unit (see FIG. 10). The region 22A is similar to the region 26A in that the upper part communicates with the port 86a of the sleeve 84 and the lower part is connected to the center rod air port 130 by the conduit 134.

In this region 22A, piping is vertically performed from the inlet/outlet of the port 86a to the central portion of the connection side surface 25 on the side of the main body unit. The piping is then performed laterally from the valve body receiving part 22 to be connected to the center rod air port 130, so that the conduit 134 is formed as a whole.

The upper part of the region 22B of the valve body receiving part 22 is a port for discharging the compressed air in the left air chamber 32, and the upper part of the region 22B is a part of the conduit 110 and is finally connected to the air outlet 92.

Further, the lower part of the region 22B is a port for discharging the compressed air in the right air chamber 42, and the region 22B is a part of the conduit 108 and is finally connected to the air outlet 92.

The region 22C of the valve body receiving part 22 is a port for supplying and exhausting the compressed air in the left air chamber 32, and is connected to the conduit 104 through the region 22C.

The region 22D of the valve body receiving part 22 is a port for supplying and exhausting the compressed air in the right air chamber 42, and is connected to the conduit 106 through the region 22D.

The region 22E of the valve body receiving part 22 is a conduit through which the compressed air constantly supplied from the air inlet 91 passes and is also a part of the conduit 132, and the compressed air is sent to the center rod air port 130.

The connection side surface 25 of the valve body 80 on the side of the main body unit and the valve body receiving part 22 are shaped so as to correspond. As illustrated in FIGS. 9 and 10, the gasket 90 that has a thin loop-shaped outer periphery, has a vertically long shape, and is made of rubber that can expand and contract, in which the outer periphery with semi-circular upper and lower parts is defined by an outline frame 90w, is placed in the regions 22A, 22B, 22C, 22D, and 22E of the valve body receiving part 22 of the main body unit 20 that correspond to the regions 26A, 26B, 26C, 26D, and 26E of the connection side surface 25 of the valve body 80 on the side of the main body unit. The gasket 90 is sandwiched between the connection side surface 25 of the valve body 80 on the side of the main body unit and the valve body receiving part 22.

Figure 11:
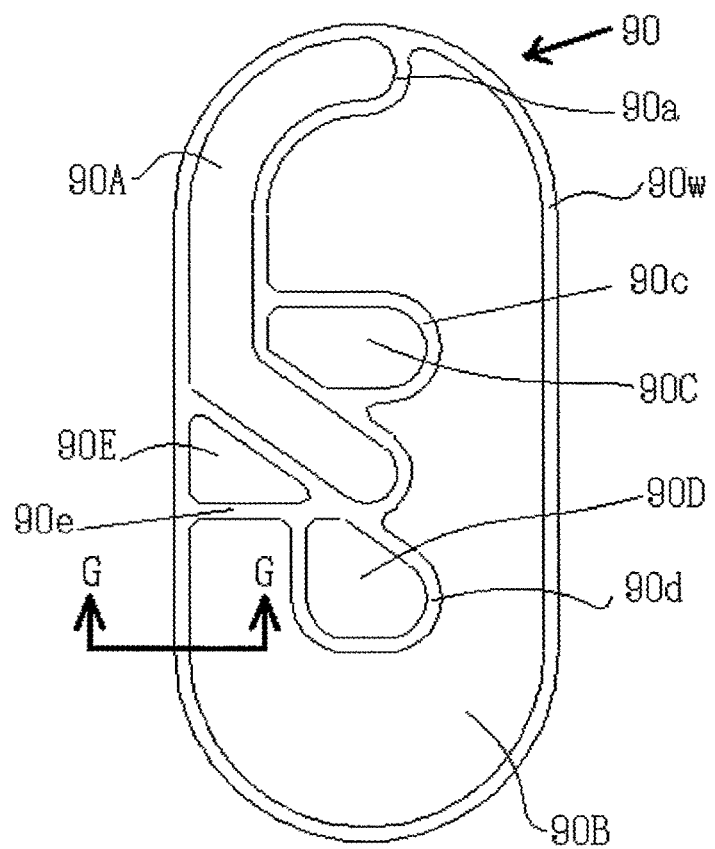
FIG. 11 is a front view of the gasket 90.

As illustrated in FIGS. 9, 10, and 11, the gasket 90 having a thin loop-shaped outer periphery has a region 90A that is defined by the outline frame 90w and an outline frame 90a, a region 90C that is defined by the outline frame 90a and an outline frame 90c, a region 90D that is defined by an outline frame 90d and an outline frame 90e, a region 90E that is defined by the outline frame 90e, the outline frame 90a, and the outline frame 90w, and a region 90B that is defined by the outline frame 90w, the outline frame 90a, the outline frame 90c, the outline frame 90d, and the outline frame 90e so as to correspond to the regions 22A, 22B, 22C, 22D and 22E of the valve body receiving part 22 of the main body unit 20, which correspond to the regions 26A, 26B, 26C, 26D, and 26E of the connection side surface 25 of the valve body 80 on the side of the main body unit described above.

Figure 12:
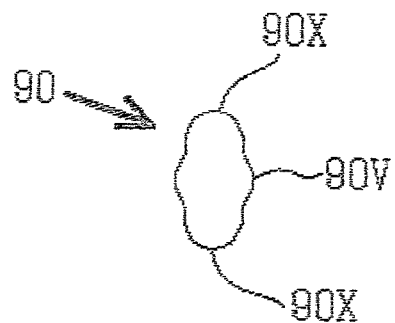
FIG. 12 is a cross-sectional view taken along a line G-G of FIG. 11.

As illustrated in the cross-sectional view taken along the line G-G of FIG. 11, which is illustrated in FIG. 12, the gasket 90 having a thin loop-shaped outer periphery has, in a depth direction of a surface of the gasket 90, an intermediate portion having a large projecting shape 90V with a partial circumference and a portion having a small projecting shape 90X in front of and behind the large projecting shape 90V. In the small projecting shape 90X of the gasket 90, the small projecting shape 90X on the side of the valve body receiving part 22 is fitted into a groove 23 formed in the valve body receiving part 22 so as to correspond to the outline frame of the gasket 90 in the valve body receiving part 22. On the other hand, the corresponding connection side surface 25 of the valve body 80 on the side of the main body side is flat, and the gasket 90 is closely contacted and sandwiched between the connection side surface 25 of the valve body 80 on the side of the main body unit and the valve body receiving part 22, so that the region 90A, the region 90C, the region 90D, the region 90E, and the region 90B each become an individual independent space and function to confine the compressed air.

The gasket 90 having a thin loop-shaped outer periphery does not hinder the effect even if the shape is slightly changed. For example, a rectangular shape is possible instead of the loop shape.

Figure 13:
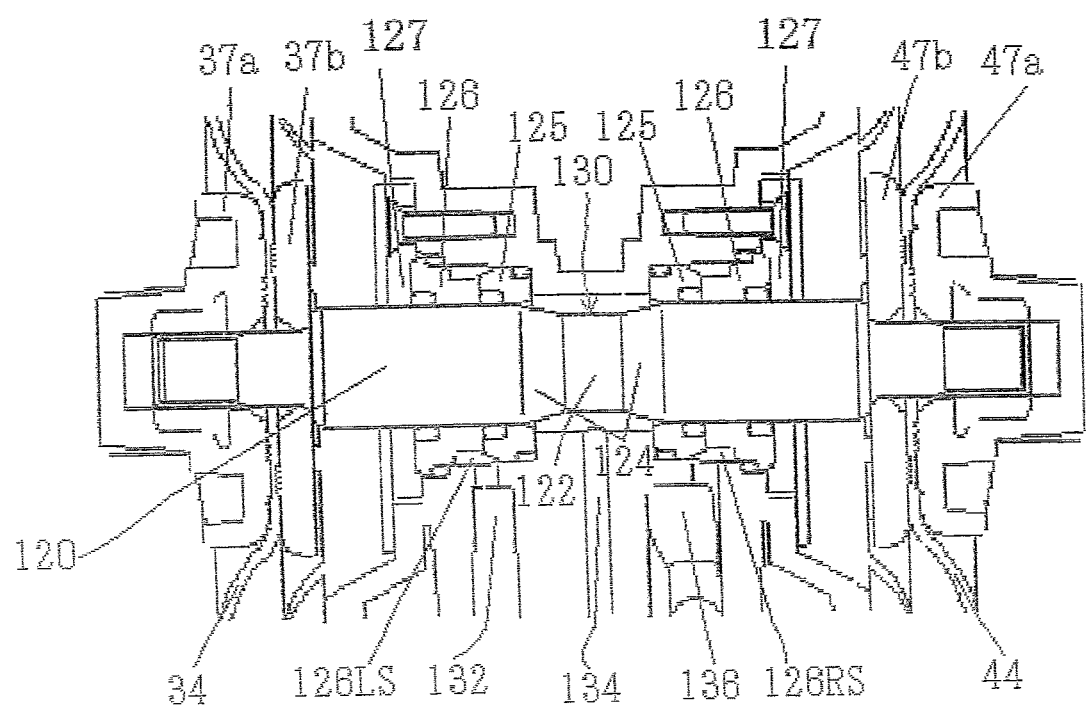
FIG. 13 is an explanatory view including a partial cross-section of a vicinity of a center rod air port 130 of a center rod 120.

FIG. 13 illustrates a vicinity of the center rod air port 130 of the center rod 120. The narrow part in the central portion of the center rod 120 is formed of a small-diameter part 122 and tapered parts 124 on both sides of the small-diameter part 122, and the narrow part functions as the center rod air port 130. The center rod 120 is slidably supported by the main body unit 20 so as to be capable of reciprocating. At the right end part of the center rod 120, the disks 47a and 47b sandwich the disc-shaped right diaphragm 44, whereas at the left end part of the center rod 120, disks 37a and 37b sandwich the disc-shaped left diaphragm 34. Reference numerals 38 and 48 indicate cushions. The conduit 134 is connected to the center rod air port 130.

The center rod 120 is slidably assembled in the central portion of the main body unit 20, guide bushes A 125 and 125 and guide bushes B 126 and 126 are assembled on the left and right sides of the central portion of the main body unit 20, and both ends of the center rod 120 are fixed by guide bush pressers 127 and 127. The respective guide bushes A 125 and 125 and the respective guide bushes B 126 and 126 not only function as bearings used when the center rod 120 slides, but also constitute a spool switching mechanism.

The left and right guide bushes B 126 and 126 have a left space 126LS and a right space 126RS, respectively on an inner diameter side. The outer diameter part of the left space 126LS communicates with the conduit 132 on the side of the left diaphragm 34, and the right space 126RS communicates with the conduit 136 on the side of the right diaphragm 44.

Figure 14A:
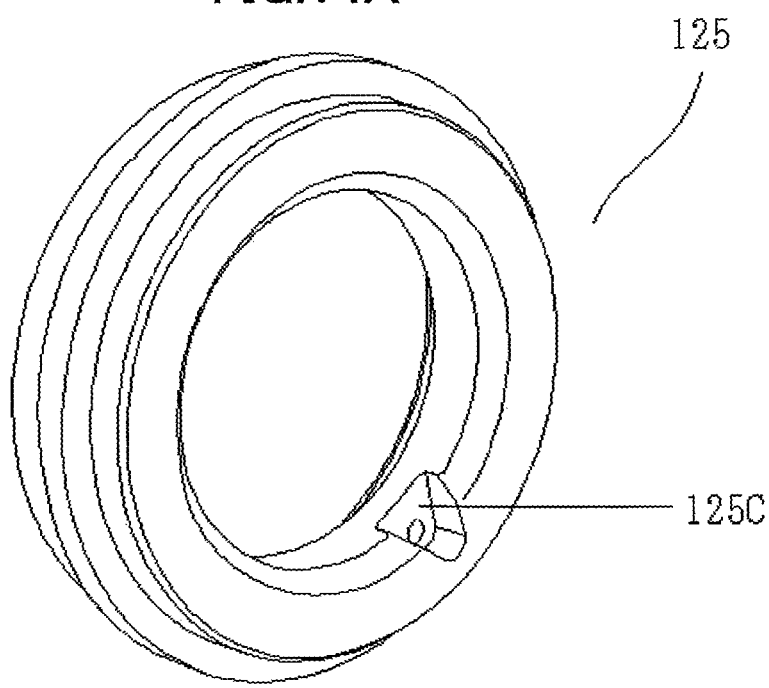
FIG. 14A is a perspective view of a guide bush A 125.

FIG. 14A is a perspective view of the guide bush A 125, and a cutaway part 125C is formed in a direction of the center rod air port 130, that is, on the inner diameter side. This is to prevent the O-ring provided on the inner diameter side from being fitted into the groove of the center rod when the pump is operated at a high supply air pressure (level exceeding specification range).

Figure 14B:
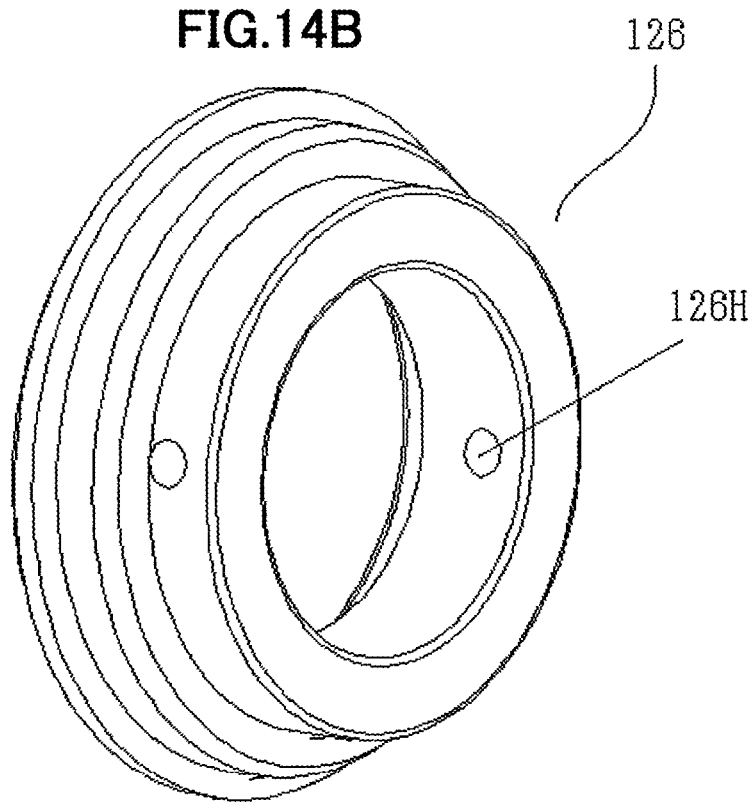
FIG. 14B is a perspective view of a guide bush B 126.

FIG. 14B illustrates the guide bush B 126, and the guide bush B 126 is attached after the guide bush A 125 is inserted. The guide bush B 126 has holes 126H in an inner diameter side surface so as to be symmetric, and these holes are air supply ports and exhaust ports for a switching function.

Figure 15:
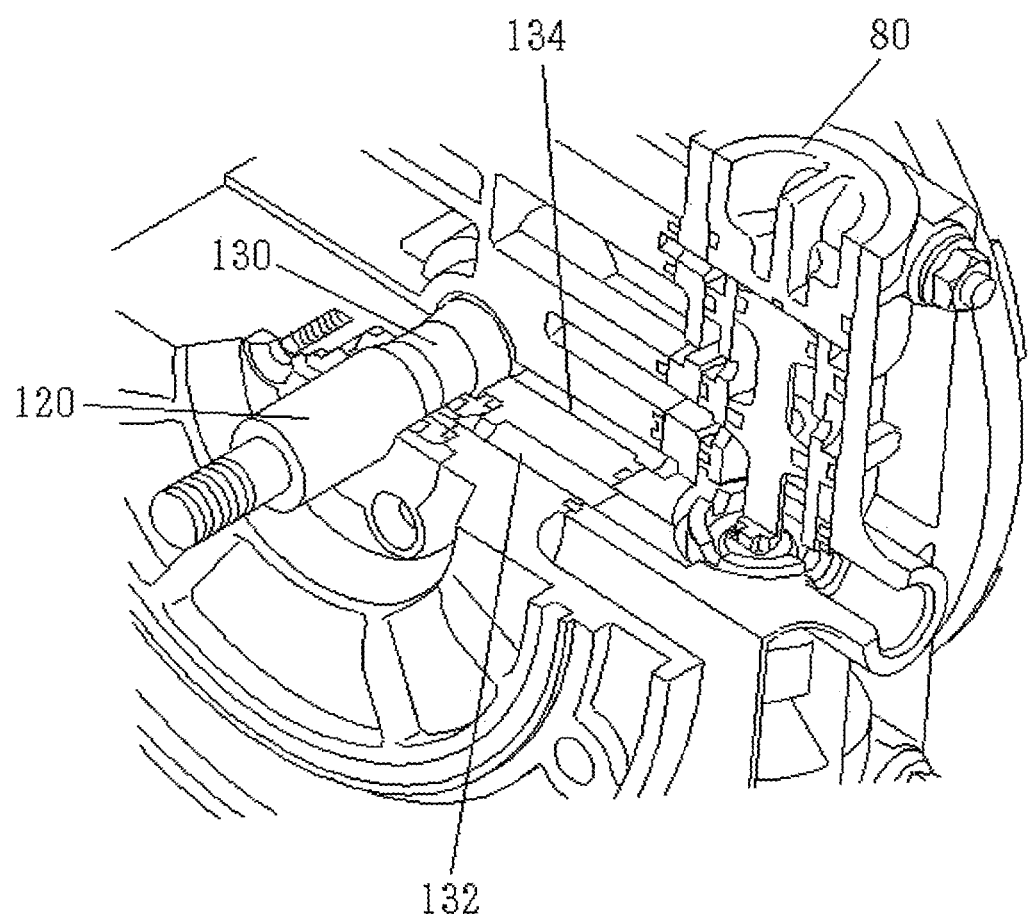
FIG. 15 is an explanatory view illustrating a relationship between a conduit 132, the center rod air port 130, a conduit 134, and the valve body 80 on a side of a left diaphragm 34.
Figure 16:
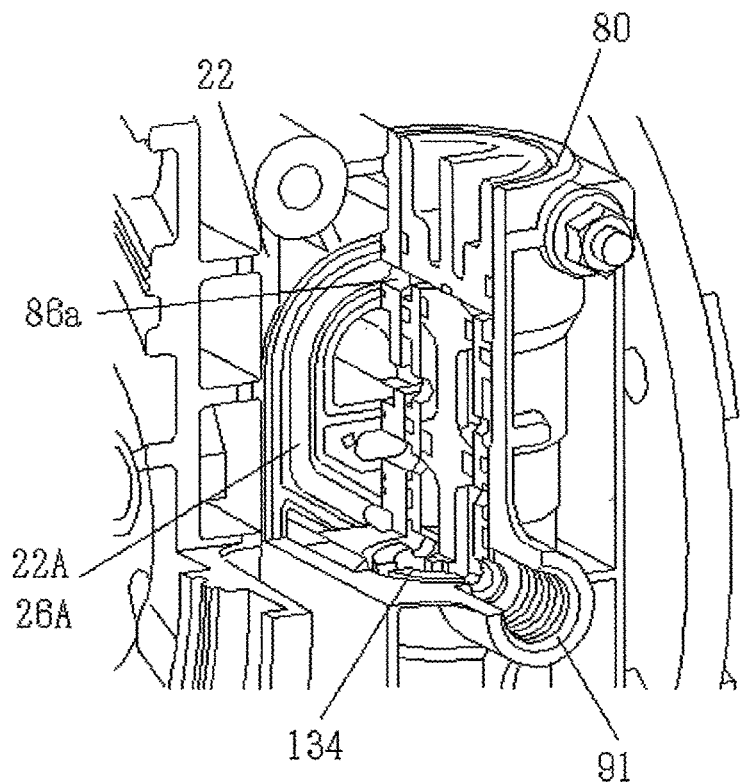
FIG. 16 is an explanatory view illustrating a relationship between the valve body 80, the valve body receiving part 22 of the main body unit 20, and the gasket 90 in the state of FIG. 15.

As illustrated in FIG. 15, on the side of the left diaphragm 34, the compressed air is constantly supplied from the air inlet 91 to the conduit 132, and when the center rod air port 130 of the center rod 120 moves to the side of the left diaphragm 34, the compressed air enters the center rod air port 130 from the left space 126LS through the hole 126H, and the conduit 134 disposed in the central portion of the main body 20 unit is connected to the region 26A through the region 22A (see FIG. 16), the compressed air moves in the space from the lower parts of the regions 22A and 26A to the upper parts, which is formed by piping, to reach the port 86a of the sleeve 84 of the valve body 80, and is supplied to the top of the spool 100. As a result, the state illustrated in FIG. 5B is obtained.

Figure 17:
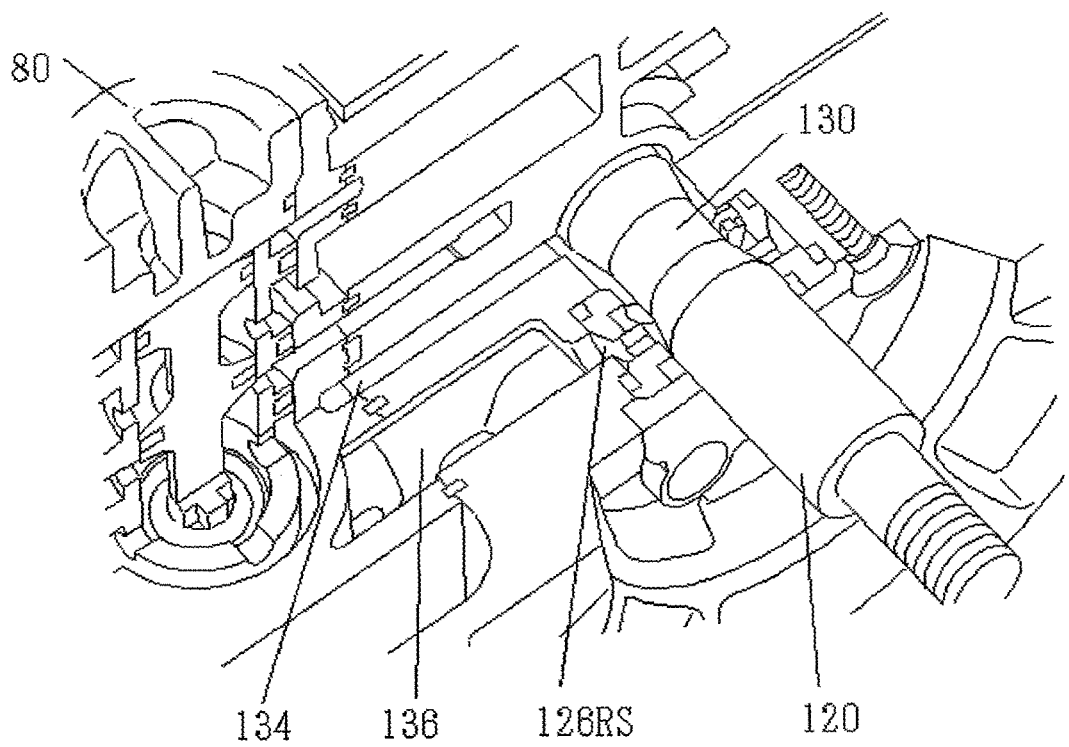
FIG. 17 is an explanatory view illustrating a state where air is exhausted from the conduit 134 disposed in the central portion of the main body unit 20 to the center rod air port 130, and the air is then exhausted from a hole 126H formed in an inner diameter side surface of the guide bush B 126 on a side of a right diaphragm 44 and from a right space 126RS on an inner diameter side of the guide bush B 126 on the side of the right diaphragm 44 to an air outlet 92 through a conduit 136.

When the center rod air port 130 of the center rod 120 moves to the side of the right diaphragm 44, the large-diameter part of the center rod 120 slides to the right and thus the supply of the compressed air from the conduit 132 is stopped, and the compressed air can flow through the conduit 134 disposed in the central portion of the main body 20 unit and the conduit 136 disposed on the side of the right diaphragm 44, the compressed air inside the sleeve 84 of the valve body 80 is exhausted from the port 86a, the compressed air moves in the space from the upper part to the lower part of 22A in the region 26A (see FIG. 16), which is formed by piping, to be exhausted from the conduit 134 disposed in the central portion of the main body unit (see FIG. 17) to the center rod air port 130, the air is exhausted from the hole 126H on the inner diameter side of the guide bush B 126 on the side of the right diaphragm 44 and from the right space 126RS on the inner diameter side of the guide bush B 126 on the side of the right diaphragm 44 to the air outlet 92 through the conduit 136, so that the state illustrated in FIG. 5A is obtained.

Next, an operation of the diaphragm pump 10 will be briefly described.

As illustrated in FIG. 1, the diaphragm pump 10 according to the present invention takes the compressed air from the air inlet 91 through the conduit 102. The compressed air is then supplied to the spool 100 disposed inside the valve body 80. In FIG. 5A, the compressed air is sent from the spool 100 to the left air chamber 32 through the conduit 104. Consequently, the center rod 120 moves to the left on the drawing. Reference numeral 34 indicates a left diaphragm. On the other hand, the right air chamber 42 discharges the compressed air through the conduit 106. Reference numeral 44 indicates a right diaphragm. The compressed air in the right air chamber 42 is discharged from the conduit 106 to the air outlet 92 through the spool 100 and the conduit 108.

Regarding the fluid sent in such a state, as the left air chamber 32 is expanded, the fluid introduced into the left pump chamber 36 is conveyed in a fixed amount through the check valve 54 toward the OUT manifold 60. Further, as air is exhausted from the right air chamber 42, the right pump chamber 46 is expanded, and a fluid is sent in a fixed amount from the IN manifold 50 to the right pump chamber 46 through the check valve 51.

As the center rod 120 slides toward the left air chamber 32, the conduit 132 that is branched partway from the conduit 102 of the air inlet 91 is connected to the port 86a of the valve body 80 at the top of the spool 100 by the conduit 134, and the compressed air is supplied from the center rod air port 130 to the top of the spool 100. As a result, the spool is in the state illustrated in FIG. 5B, and the entire spool 100 is pushed down to be lowered to the lower limit.

At this time, the compressed air is supplied to the right air chamber 42, but the left air chamber 32 is in an exhaust state, the compressed air in the left air chamber 32 is exhausted from the port 86c, and the compressed air in the left air chamber 32 is discharged from the port 86b. As a result, the fluid introduced to the right pump chamber 46 in the right diaphragm pump chamber 40 is conveyed in a fixed amount toward the OUT manifold 60 through the check valve 53. Further, as air is exhausted from the left air chamber 32, the left pump chamber 36 is expanded, and a fluid is sent in a fixed amount from the IN manifold 50 to the left pump chamber 36 through the check valve 52.

Figure 18:
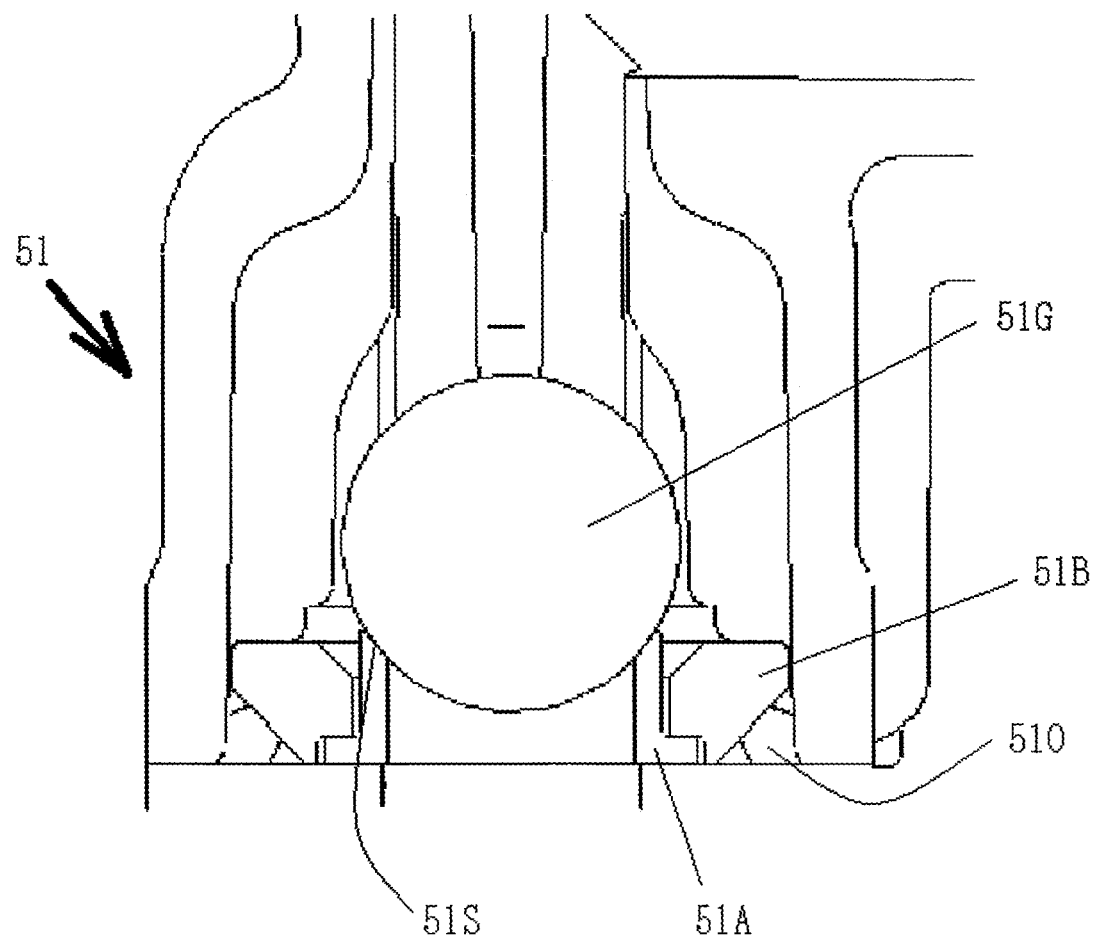
FIG. 18 is a partial cross-sectional view of a check valve 51.

FIG. 18 illustrates an example of the check valves 51, 52, 53, and 54, and these check valves are composed of, for example, a ball 51G, a ball seal part 51S, an O-ring 51O, a valve seat A 51A, and a valve seat B 51B. As the valve seat 51 is divided into the valve seat A 51A and the valve seat B 51B, a clearance is made between the two parts and the stress generated in the valve seat A 51A is not transmitted to the valve seat B 51B. The deformation of the valve seat B 51B is at a level that does not cause problems, and stable sealing is achieved. Such a valve seat is a check valve for a conveying fluid.

Figure 19:
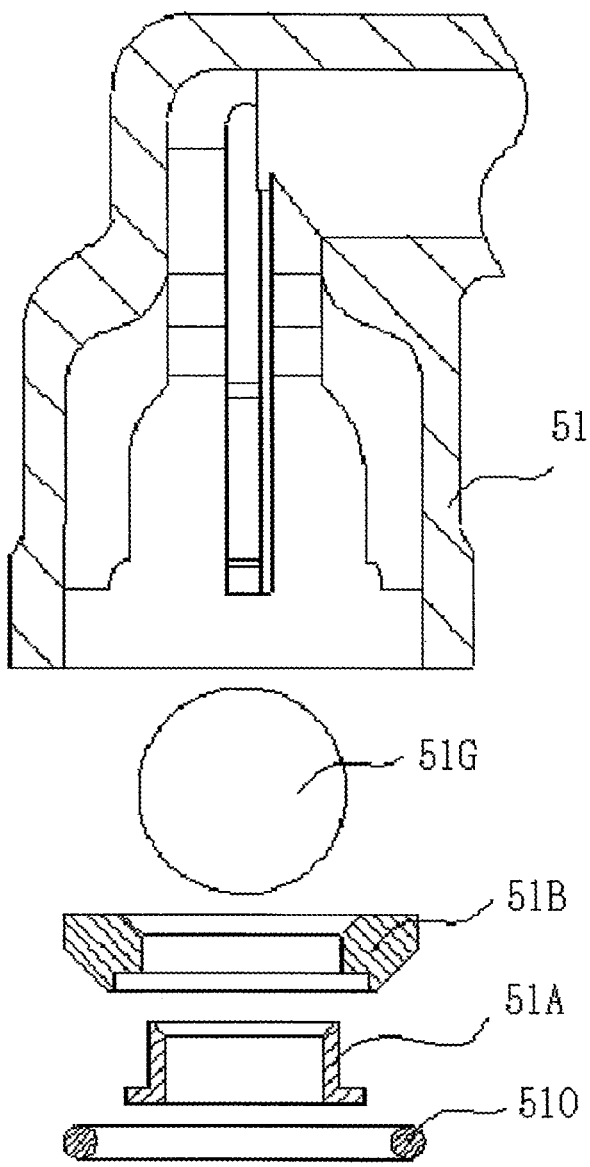
FIG. 19 is an exploded view of FIG. 18.

FIG. 19 is an exploded view of FIG. 18.

INDUSTRIAL APPLICABILITY

The spring mechanism (detent mechanism) is omitted and the center rod air port 130 is disposed in the center rod 120 for the purpose of reliably lowering the spool 100. Consequently, the spool 100 and the center rod 120 slide reliably, a conveying fluid is conveyed more reliably, and the number of parts used is reduced. As a result, it is possible to manufacture a diaphragm pump capable of achieving simple and reliable conveyance. Moreover, the valve body 80 and the valve body receiving part 22 of the main body unit 20 are separated, the gasket 90 is disposed between the valve body 80 and the valve body receiving part 22, and in particular, vertical piping is performed, so that the spool can slide smoothly, vertical piping can be omitted, individual piping can be integrated.

In addition, the spool inside the valve body 80 can be easily taken out, and thus maintenance can be performed easily. Since the spool is also simple, its sliding operation can be performed reliably.

REFERENCE SIGNS LIST

10 diaphragm pump
20 main body unit
22 valve body receiving part
22A, 22B, 22C, 22D, 22E region
25 connection side surface
26A, 26B, 26C, 26D, 26E region
30 left diaphragm pump chamber
32 left air chamber
34 left diaphragm
36 left pump chamber
40 right diaphragm pump chamber
42 right air chamber
44 right diaphragm
46 right pump chamber
IN manifold
OUT manifold
80 valve body
84 sleeve
86a, 86b, 86c, 86d, 86e port
90 gasket
90A, 90C, 90D, 90E, 90B region
90w, 90a, 90c, 90d, 90e outline frame
91 air inlet
92 air outlet
100 spool
S3, S2, S1 disc-shaped portion
102, 104, 106, 108, 110 conduit
120 center rod
125, 125 guide bush A
126, 126 guide bush B
126H hole
126LS left space
126RS right space
130 center rod air port
132, 134, 136 conduit

The invention claimed is:

1. A diaphragm pump comprising:
   paired diaphragms that define pump chambers and air chambers;
   a main body unit that slidably supports a center rod at a central portion of each diaphragm so as to be capable of reciprocating the center rod; and
   a valve body that houses a spool that switches supply of a fluid to the air chambers so as to reciprocate the center rod, the valve body including a sleeve, and the spool is disposed inside the sleeve to be reciprocated in an axial direction,
   wherein the spool includes a third disc-shaped portion S3, a second disc-shaped portion S2, and a first disc-shaped portion S1, a surface area of each disc-shaped portion that receives a compressed air pressure has a relationship that an upper side of the third disc-shaped portion S3>a lower side of the second disc-shaped portion S2>an upper side of the first disc-shaped portion S1,
   wherein each disc-shaped portion of the spool includes a seal ring functioning as a packing, each disc-shaped portion separates a plurality of ports within the sleeve from one another, the sleeve includes, for the diaphragms, two ports that can communicate with an air inlet,
   wherein while the spool moves from a top of the valve body toward a bottom of the valve body in the sleeve, the air inlet is always located between the second disc-shaped portion S2 and the first disc-shaped portion S1, and a port that can communicate with the air inlet is changed depending on a movement of the spool, so that supply of the compressed air supplied from the air inlet is switched from one air chamber to another air chamber, and
   wherein when the spool moves to the bottom of the valve body in the sleeve, because the surface area of the lower side of the second disc-shaped portion S2 is larger than the surface area of the upper side of the first disc-shaped portion S1, a force is applied to the spool so as to move the spool toward the top of the valve body in the sleeve, and when the spool moves to the top of the valve body in the sleeve, the compressed air is supplied to a port which is located on top of the sleeve and the spool is pushed down toward the bottom of the valve body in the sleeve.

2. The diaphragm pump according to claim 1, wherein the center rod includes, near a center of the center rod, a center rod air port, when the center rod slides to be moved to one side, the compressed air is capable of entering the center rod air port from a conduit to which the compressed air is constantly supplied from the air inlet, and the compressed air passes through the center rod air port of the center rod to be supplied to an upper part of the third disc-shaped portion S3, so that the spool is lowered.

3. The diaphragm pump according to claim 2, wherein a guide bush is fitted on an outer peripheral part of the center rod, a hole for allowing the compressed air to flow is formed in a body part of the guide bush, and as the center rod slides, the center rod air port that has slid is used to allow the compressed air to pass through the center rod air port and to be supplied to the upper part of the third disc-shaped portion S3, so that the spool is lowered.

4. The diaphragm pump according to claim 2, wherein when the center rod slides to be moved to another side that is opposite to the one side, supply of the compressed air that is constantly supplied from the air inlet to the center rod air port stops, the compressed air is capable of flowing in a conduit that is constantly connected to a port on an upper side of the third disc-shaped portion S3 and a conduit that communicates with an air outlet, and the center rod air port communicates with the conduit that is connected to the port on the upper side of the third disc-shaped portion S3 even when the center rod slides to be moved from the one side to the another side.

5. The diaphragm pump according to claim 1, wherein the valve body includes a plurality of ports at arbitrary positions, the main body unit and the valve body are separated, a gasket having a loop-shaped or rectangular outer periphery is disposed between the main body unit and the valve body, and a plurality of openings, that allow the compressed air from the ports to flow through, are disposed in the gasket that is positioned along a surface where the main body unit contacts the valve body.

\* \* \* \* \*